No. 770,658. Patented September 20, 1904.

UNITED STATES PATENT OFFICE.

DAVID SANDMANN, OF BERLIN, AND GEORG EICHELBAUM, OF CHARLOTTENBURG, GERMANY.

PROCESS OF PRESERVING FRUIT-JUICES.

SPECIFICATION forming part of Letters Patent No. 770,658, dated September 20, 1904.

Application filed October 28, 1902. Serial No. 129,171. (No specimens.)

*To all whom it may concern:*

Be it known that we, DAVID SANDMANN, manufacturer, residing at 105 Alexandrinenstrasse, Berlin, and GEORG EICHELBAUM, doctor of philosophy, residing at 11 Augsburgerstrasse, Charlottenburg, Kingdom of Prussia, German Empire, subjects of the King of Prussia, German Emperor, have jointly invented new and useful Improvements in Preserving and Purifying Fruit-Juices, of which the following is a specification.

This invention relates to the process of preserving and purifying fruit-juices; and has for its object to render the process more efficient.

Fruit-juices, owing to the sugar, albumen, and pectin which they contain, are readily subject to putrefaction and fermentation, so that they speedily deteriorate when kept. Various methods of combatting this tendency have hitherto been employed.

First. Sterilization, which it is difficult to effect upon a large scale, owing to the fact that the heat employed imparts what is termed a "flavor of cooking," and is accompanied by loss of aroma. Furthermore, the transportation of a sterilized juice is difficult, as the usual receptacles do not generally protect the juice from the air, so that the juice, especially when once it has been broached, is very liable to decomposition.

Second. The addition of alcohol is costly. It is necessary to employ about sixteen per cent. alcohol when treating juice in this manner. The greater part of this is lost in the subsequent boiling of the juice with sugar, thus producing a corresponding loss of aroma.

Third. Salicylic acid cannot be removed from the juices, and as it is only efficient in large quantities it produces effects prejudicial to health. Smaller quantities could not be relied upon to completely prevent the formation of mold. Acids are also formed which appear to impart a less agreeable flavor to the juice. Owing to a decomposition of the salicylic acid, which frequently takes place from unknown causes, a smell of carbolic acid is sometimes apparent, making the juice entirely valueless We have discovered in the employment of hydrofluoric acid and soluble acid compounds of the same a means by which not only can fruit-juices be thoroughly preserved, but a purification and clarification of the same effected. A further advantage of the employment of these compounds is that they may be readily and completely removed. Finally, neither the taste nor smell is effected.

The properties of hydrofluoric acid are not unknown. Like every strong acid, it tends to kill organisms. The employment of hydrofluoric acid for preserving fruit-juices and its subsequent removal before the juice is used is, however, absolutely novel and has never before been made or described. Further, by its use an entirely novel and unexpected technical result is attained in the purification which takes place, and this without the valuable aromatic properties of the juice being prejudicially affected in any way by the hydrofluoric acid. If after the addition of hydrofluoric acid the juice is allowed to stand for some time, the pectin and albumen are deposited in the form of a thick leather-like layer which under the microscope appears absolutely free from organisms and which contains all the impurities. This purification goes so far that the juices even after the removal of the hydrofluoric acid in the manner hereinafter described, remain free from ferments, as the albumen and pectin, which are liable to fermentation or putrefaction, have been removed. The juice itself is entirely clear, bright, and ready for use. The preservation of the juices is therefore effected not only owing to the antiseptic property of the hydrofluoric acid itself, but also owing to the resultant purification.

The process may be carried out in the following manner: One hundred liters of raspberry-juice (for example) to be preserved are mixed immediately after extraction with aqueous hydrofluoric acid. Ordinarily about fifty cubic centimeters of the usual commercial forty-per-cent. acid are sufficient for one hundred liters. (Obviously this quantity may be varied according to the kind of fruit-juice under treatment.) In the case of juices which contain a large proportion of sugar, such as cherry-juice, a larger addition of hydrofluoric acid may be made, while retaining the proper proportion of sugar. After some time the thick skin, above referred to, is deposited, the juice being bright and clear. Before use it is decanted and the quantity of slaked lime required for effecting neutralization added, the mixture being then stirred and allowed to settle for about twenty-four hours. The calcium fluorid formed adheres strongly to the bottom, so that the clear juice may be poured off and (after filtering, if considered necessary) boiled with sugar. The lime may be replaced by any other suitable reagents, such as alkaline earths or carbonic-acid salts of the alkaline earths, and obviously the action of the hydrofluoric acid may be applied before the pressing and cleansing of the fruit-pulp, the juice extracted being then clear and pure. If the juice is not intended to be used as such, but to be fermented later, so as to form aromatic, alcoholic, or other drinks with the addition of sugar, the neutralization may of course be effected with alkalies or carbonic-acid salts of alkalies. The soluble fluoric salts then at the same time exert a favorable effect upon the fermenting action.

Juices obtained with the employment of hydrofluoric acid are quite clear, of good natural aroma, and free from all foreign substances.

What we claim as our invention, and desire to secure by Letters Patent, is—

The process for preserving, keeping and purifying fruit-juices, which consists in adding to the juice to be treated a solution of hydrofluoric acid, separating the liquid from the precipitate formed, adding to the liquid an alkaline-earth compound to neutralize the liquid, and separating the precipitate formed from the liquid.

In witness whereof we have hereunto signed our names, this 10th day of October, 1902, in the presence of two subscribing witnesses.

DAVID SANDMANN.
GEORG EICHELBAUM.

Witnesses:
HENRY HASPER,
WOLDEMAR HAUPT.